United States Patent

[11] 3,568,151

[72] Inventor Hideyasu Majima
Kokubunji-shi, Japan
[21] Appl. No. 625,349
[22] Filed Mar. 23, 1967
[45] Patented Mar. 2, 1971
[73] Assignee Hitachi, Ltd.
Tokyo-To, Japan
[32] Priority Mar. 23, 1966
[33] Japan
[31] 41/17,417

[54] PHOTOELECTRICAL CONVERSION SYSTEM FOR PATTERN-RECOGNIZING APPARATUS AND THE LIKE
6 Claims, 24 Drawing Figs.

[52] U.S. Cl. .......... 340/146.3, 250/219, 178/7.1
[51] Int. Cl. .......... G06k 9/00
[50] Field of Search .......... 340/146.3; 330/29, 28, 35, 38 (FE); 250/219 (ICR), 206, 214; 338/17; 178/7.1; 307/304

[56] References Cited
UNITED STATES PATENTS

| | | | |
|---|---|---|---|
| 3,146,422 | 8/1964 | Greanias et al. | 340/146.3 |
| 3,417,372 | 12/1968 | Bieser | 340/146.3 |
| 3,111,556 | 11/1963 | Knoll et al. | 178/7.1 |
| 2,943,208 | 6/1960 | Shepard et al. | 340/146.3 |
| 3,025,342 | 3/1962 | Volberg | 340/146.3 |
| 3,322,893 | 5/1967 | Townsend | 178/7.1 |
| 3,379,826 | 4/1968 | Gray | 340/146.3 |

*Primary Examiner*—Thomas A. Robinson
*Attorney*—Craig, Antonelli, Stewart & Hill

ABSTRACT: A photoelectrical conversion system for a pattern-recognizing apparatus including pattern signal amplifiers controlled by a control signal representing accurate levels of illumination of blank, noncharacter containing portions of a pattern.

(OPTIMUM CONDITION)

SHL: STANDARD LEVEL OF HIGH LIGHT PORTION

DL: DETECTING LEVEL

SPT: STANDARD LEVEL OF PATTERN PORTION (DECREASE IN LIGHT SOURCE OR PHOTO-SENSITIVE ELEMENT)

PHOTOELECTRICAL CONVERSION SYSTEM FOR PATTERN-RECOGNIZING APPARATUS AND THE LIKE

This invention relates to a photoelectrical conversion system for a pattern-recognizing apparatus and the like, and more particularly to a system for stabilizing pattern signals which are produced by photosensitive elements.

In the conventional pattern-recognizing system, characters or patterns to be recognized, which are usually printed on sheets or papers, are successively converted into optical images by suitable, optical means, and then converted into electrical signals for each line element or picture element by suitable photosensitive elements. Consequently, each pattern signal which is an output of the photosensitive element, includes two levels, one of which is a mark level representing the existence of the line elements or picture elements of the characters, and the other one of which is a space level representing the blank portions of the sheet on which the characters or patterns are printed. When dark images are used as the optical images, the mark level is introduced from the dark portions at which the line elements or picture elements of the characters are positioned, and said space level is introduced from the highlight portions at which the blank portions of the sheet are positioned.

The brightness of the blank portions tends to change with variation of the illuminating power to the characters, or according to the reflection factor of the sheet. Moreover, the electrical characteristics of the photosensitive elements tend to change with temperature, humidity, and time. Consequently, the output signal of each photosensitive element, particularly the space level thereof, is caused to change according to such brightness, reflection factor, temperature, humidity and time.

The variation in the space level of the pattern signal brings about such a disadvantage that the mark level of such signal cannot be distinctly discriminated from the space level, as hereinafter mentioned in detail. It therefore is required that means be provided to stabilize the mark level of the pattern signal.

Various kinds of automatic gain-control systems have been utilized in the wire or wireless communication field. According to one example which has been used in radio and television receivers, the received signal is amplified by a suitable, variable-gain amplifier, and then the carrier current component thereof is extracted and rectified. This rectified component is fed back to the variable-gain amplifier as a bias-controlling signal to stabilize the output level of such amplifier. On the other hand, according to another system which has been used in the wire communication system, a pilot signal, whose frequency is selected from outside the voice frequency band, is sent out from the transmitting terminal at a predetermined, constant level, together with the voice signal. At the repeating station, the signal from the transmitting terminal is first amplified by a repeater, and the pilot signal is extracted. This pilot signal controls, electrically, the gain of the repeater to minimize the difference between the level of the pilot signal and the standard voltage. For this purpose, the repeater is composed of a feedback amplifier having a thermistor inserted within a feedback path thereof, and the resistance value of such thermistor is controlled by the pilot signal.

By using said automatic gain-control system, it is possible to compensate for the variation of signal level originating during the transmitting process, but it is impossible to minimize the variation of signal level originally included in the signal to be transmitted. Accordingly, these automatic gain-control systems are not effective for the pattern-recognizing system.

Accordingly, a general object of the present invention is to provide a photoelectrical conversion system for pattern-recognizing apparatus and the like, according to which it is possible to stabilize the pattern signals, which are output signals of the photosensitive elements.

Another object of the present invention is to provide a photoelectrical conversion system for pattern-recognizing apparatus and the like, according to which it is possible to control the space level of the pattern signal, without including any distortion in the pattern-signal component.

Still another object of the present invention is to provide a photoelectric conversion system which is very suitable for pattern-recognizing apparatus and the like wherein a number of photosensitive elements and pattern-signal amplifiers are used in the same conditions.

For the purpose as mentioned above, in the present invention, means for detecting the brightness of the blank portions of the characters or patterns to be recognized is specially provided for controlling the gain of the pattern-signal amplifiers. In one embodiment of the present invention, a combined electrical source of pulselike voltage and direct current voltage is used for driving the photosensitive elements, and a control signal is extracted from the output signal of each such photosensitive element. This control signal controls the pattern-signal amplifiers. In another embodiment, such control signal is obtained from a specific photosensitive element which is so arranged as to detect the brightness of the blank portions of the characters or patterns to be recognized. Since the gain of the pattern-signal amplifiers can be controlled only by the brightness of the blank portions of the characters, the pattern-signal component, which is usually a pulselike signal, can be amplified by the amplifier without distortions.

These and additional objects and advantages of the present invention will become more apparent from the following description when taken in connection with the accompanying drawing, in which.

Figure 1:
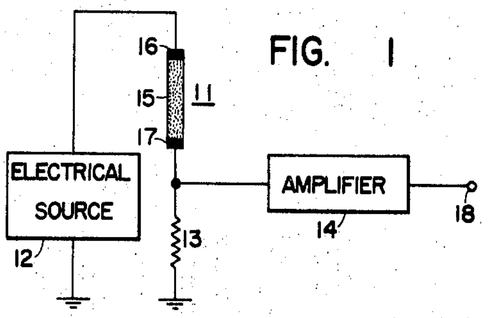
FIG. 1 is a circuit diagram illustrating one example of a conventional, photoelectric conversion unit for pattern recognition.
Figure 3A:
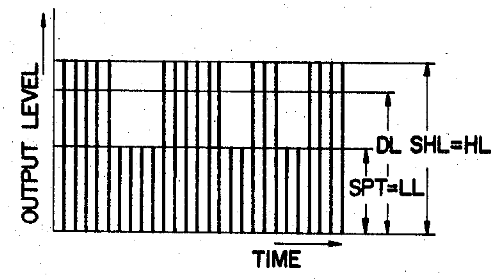
Figure 3B:
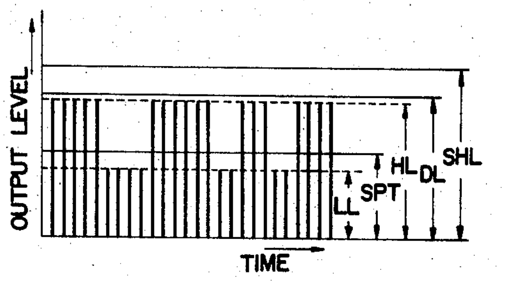
Figure 3C:
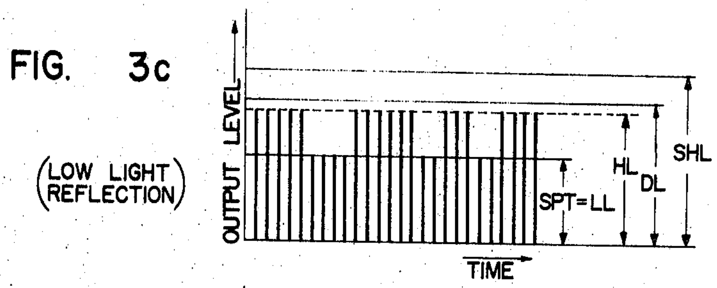
Figure 3D:
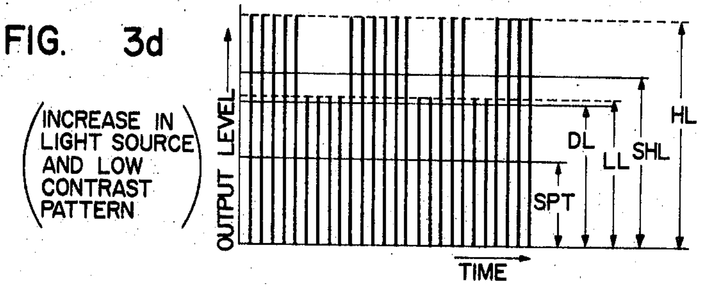
Figure 4:
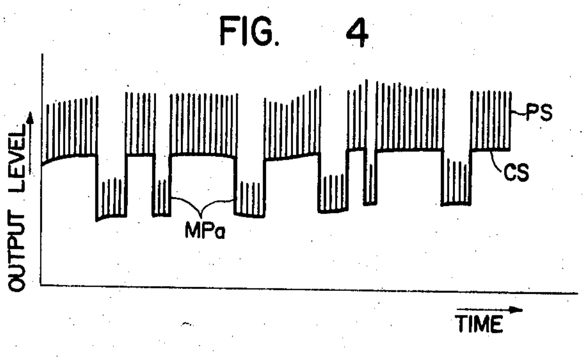
Figure 5A:
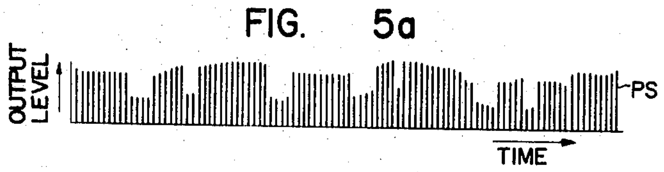
Figure 6:
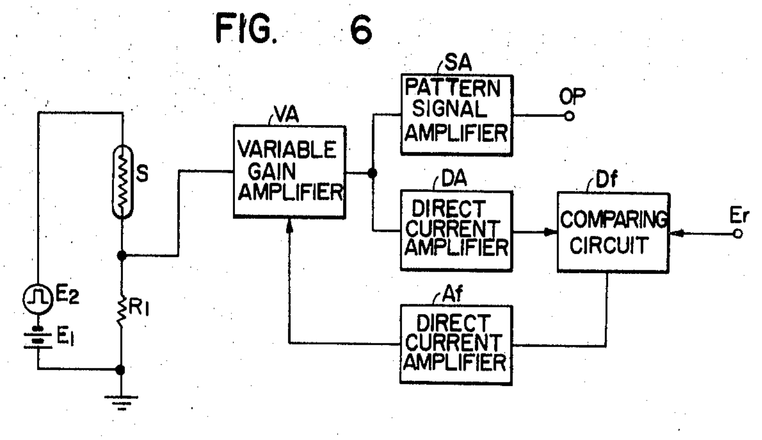
Figure 7:
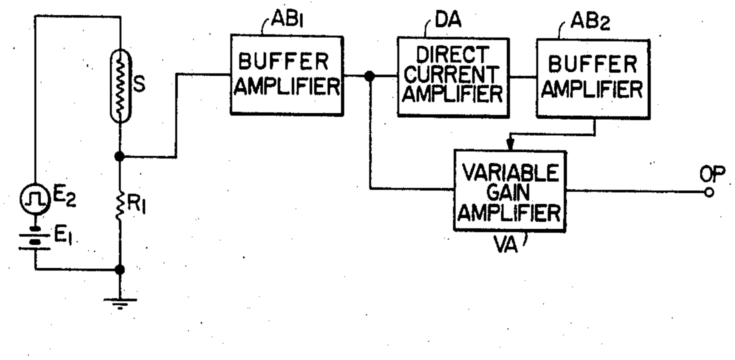
Figure 8:
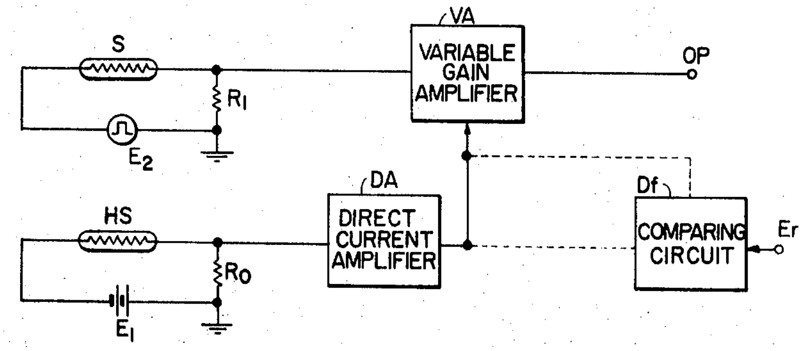
Figures 9, 10:
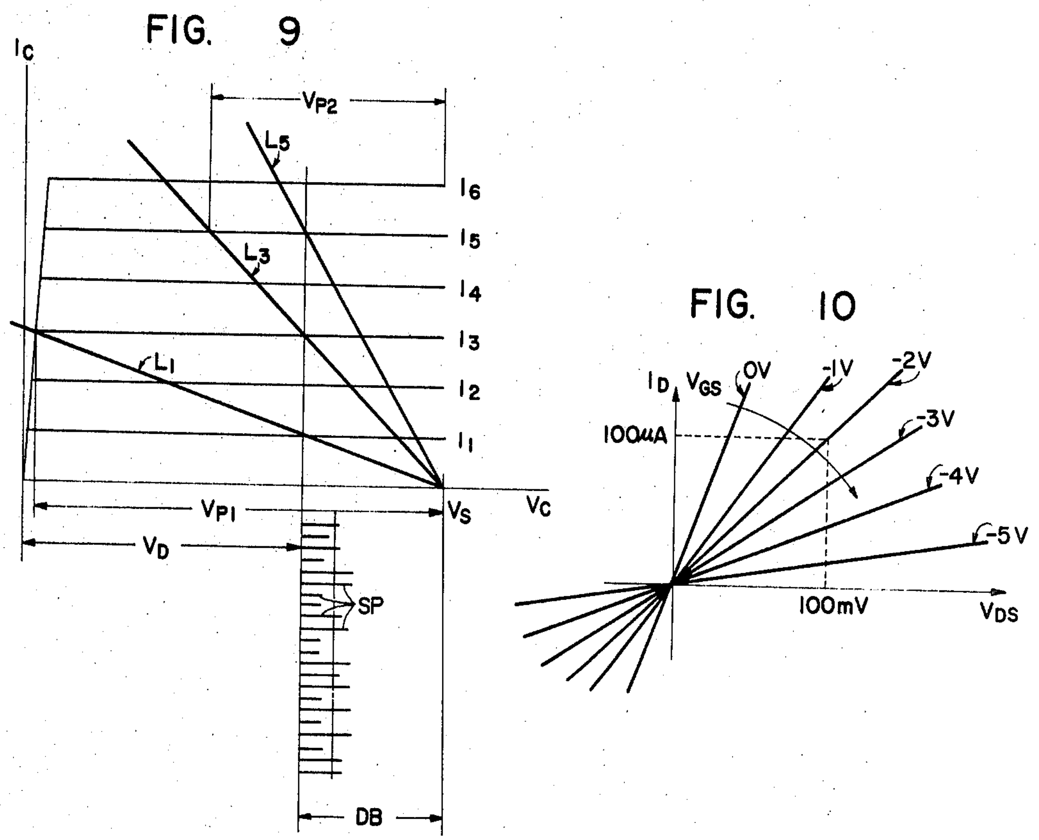
Figure 11:
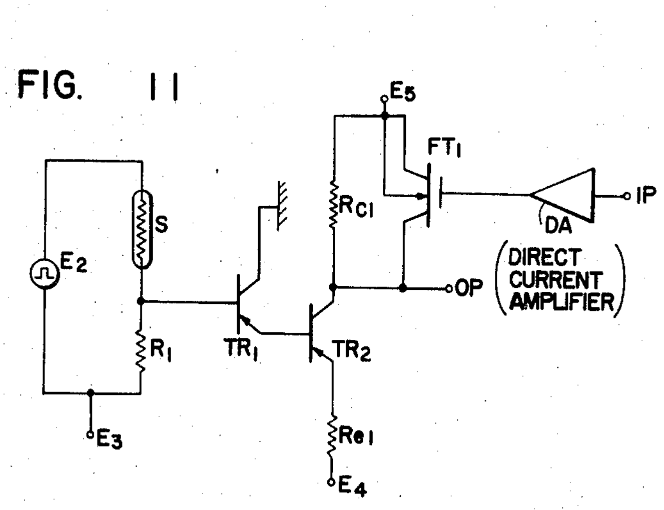
Figure 12:
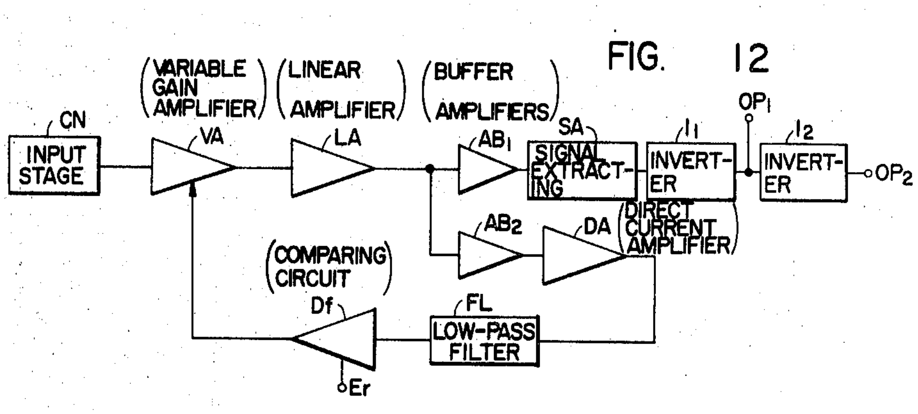
Figure 14:
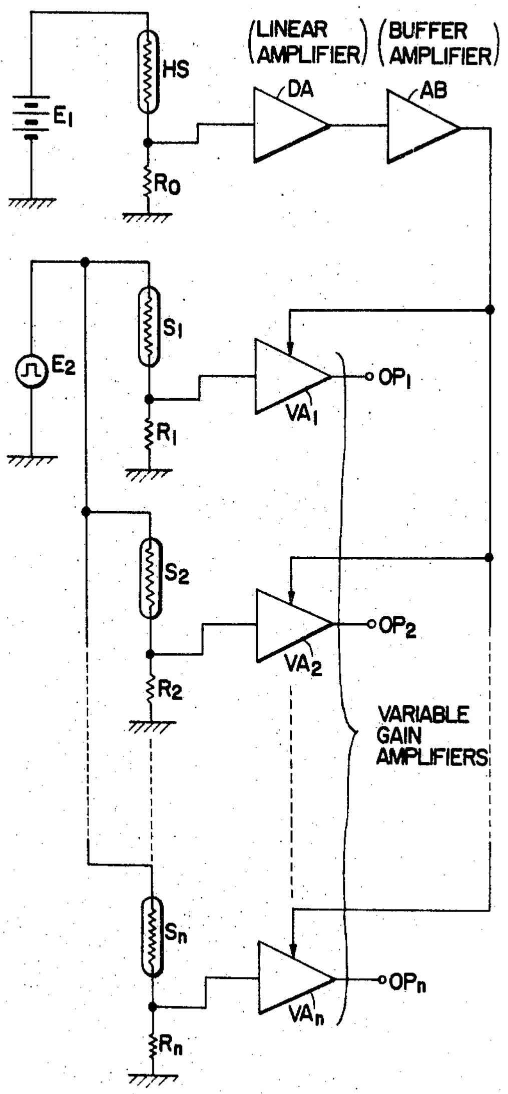
Figure 18:
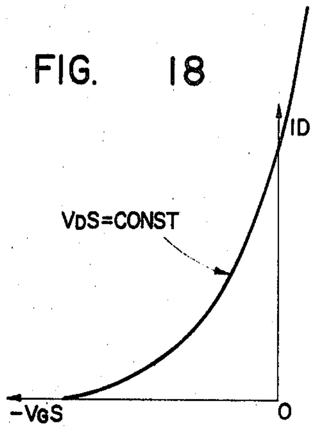
Figure 20:
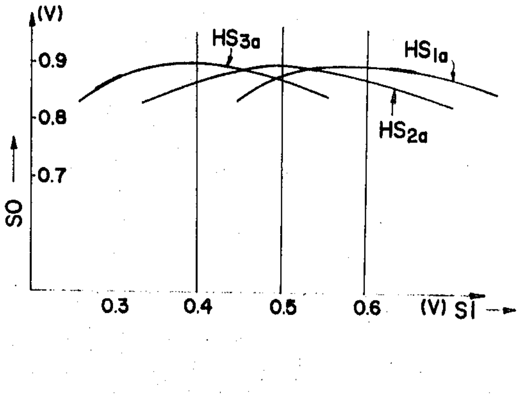
Figure 13:
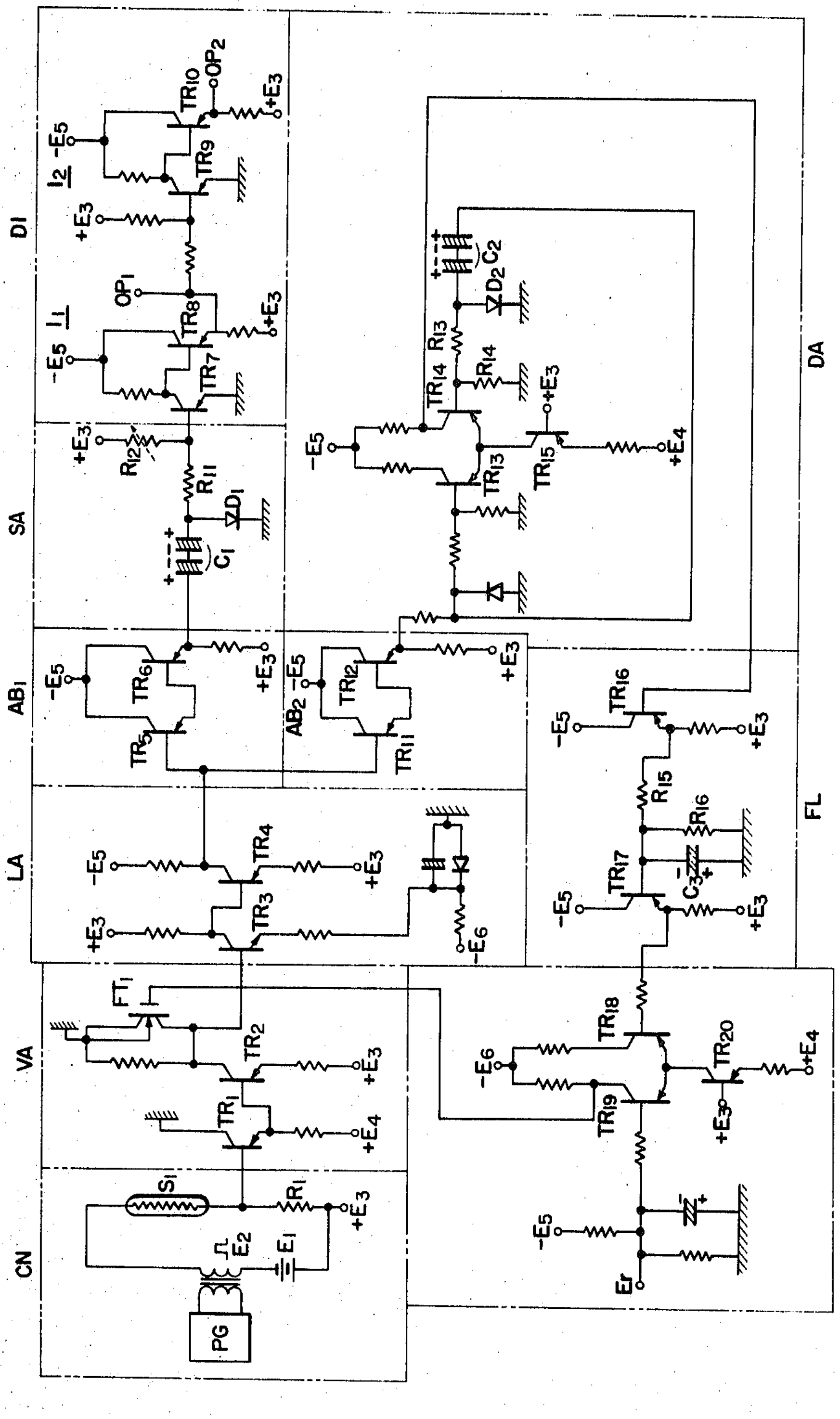
Figure 15:
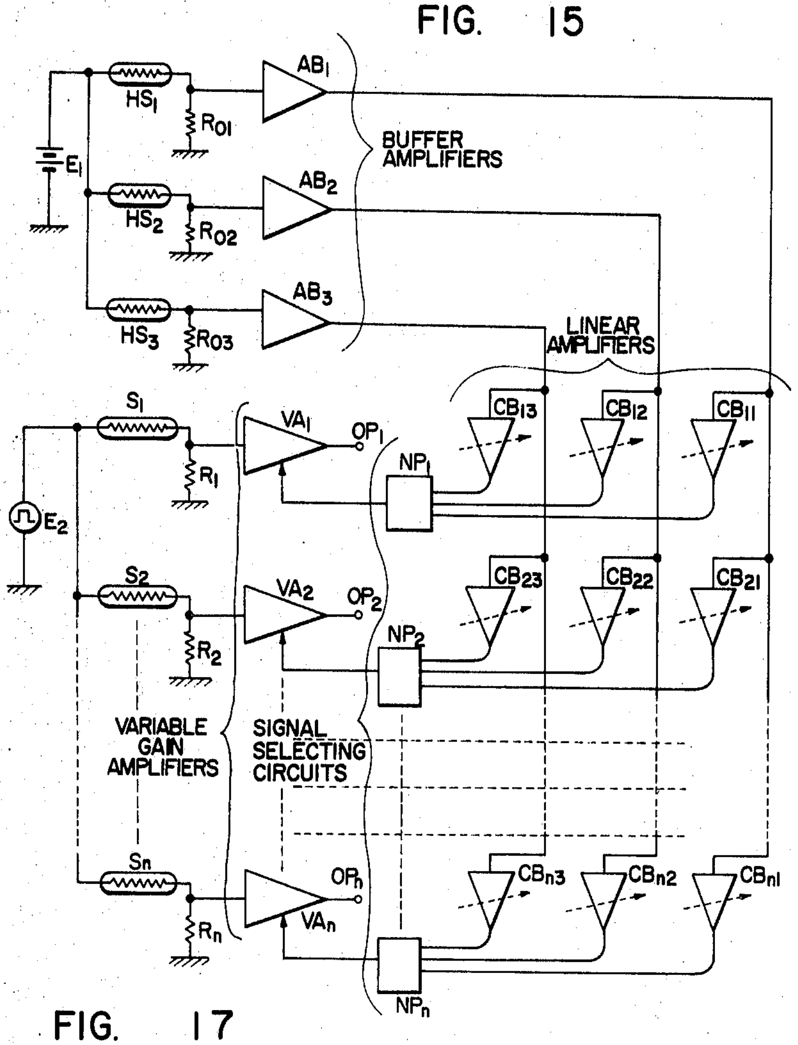
Figure 17:
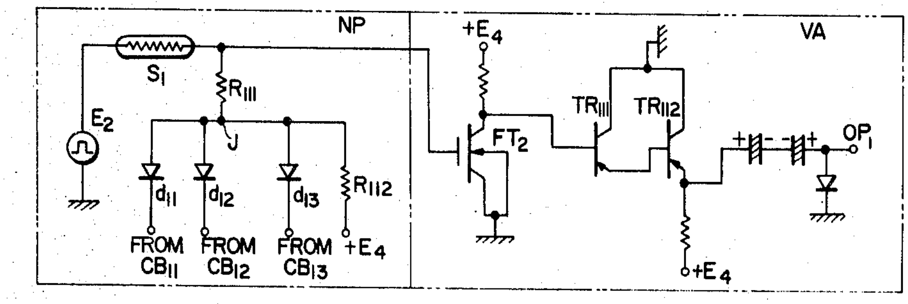
Figure 16:
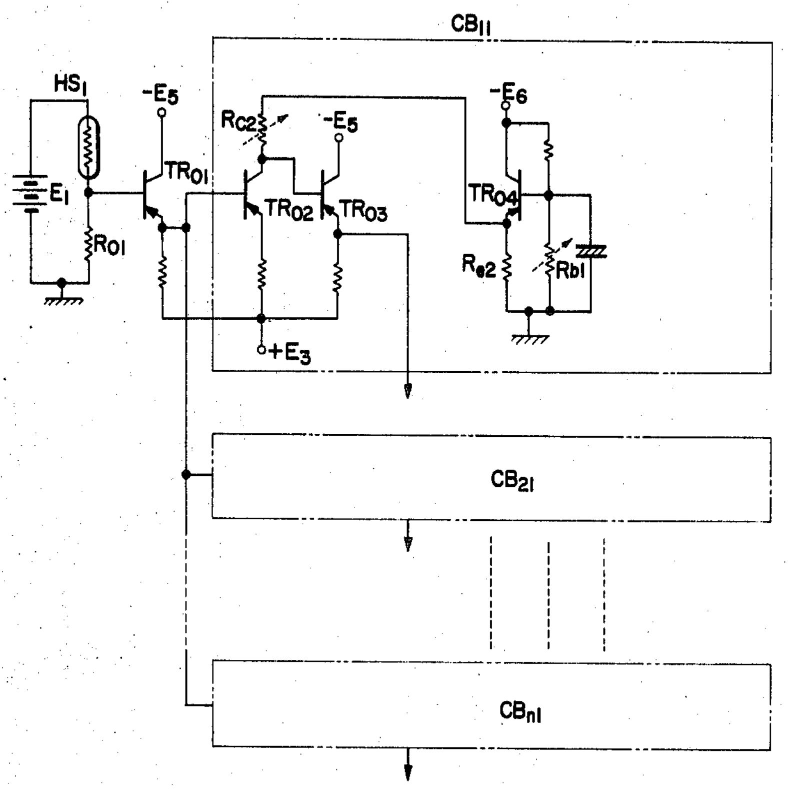
Figure 19:
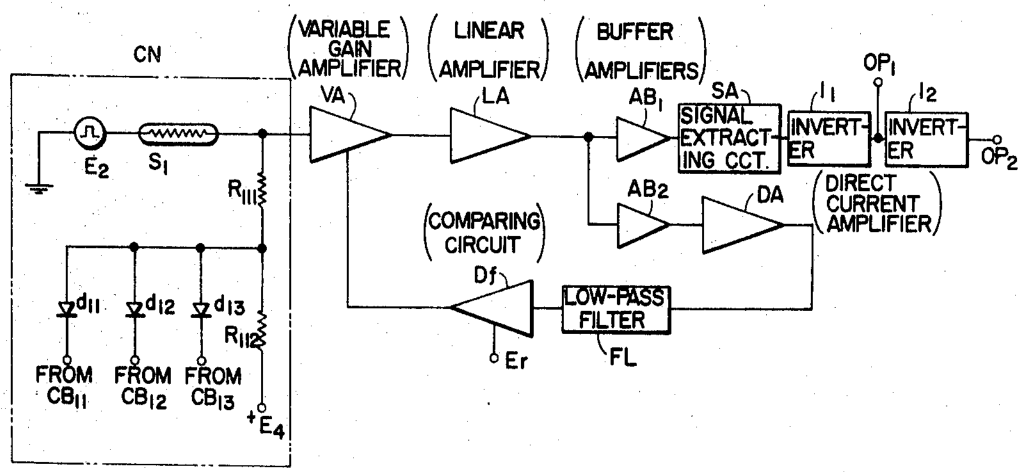

FIGS. 3*a*, *b*, *c* and *d* show waveforms of the photosensitive element used in the photoelectric conversion unit of FIG. 1;

FIG. 4 shows a waveform for illustrating one method for obtaining the control signal used in the photoelectric conversion system of the present invention;

FIGS. 5*a* and *b* show waveforms for illustrating another method for obtaining the control signal;

FIG. 6 is a schematic diagram showing one embodiment of the present invention;

FIGS. 7 and 8 are schematic diagrams showing different modifications of the embodiment shown in FIG. 6;

FIG. 9 is a characteristic diagram for illustrating the principle of the gain control according to the present invention;

FIG. 10 is a characteristic diagram for illustrating the electrical characteristics of a field-effect transistor;

FIG. 11 is a circuit diagram showing an embodiment of the present invention, wherein the field-effect transistor is used as a variable load resistance of an amplifier;

FIG. 12 is a schematic diagram showing the detail of the embodiment of FIG. 6;

FIG. 13 is a circuit diagram of the arrangement shown in FIG. 12;

FIG. 14 is a schematic diagram showing still another embodiment of the present invention;

FIG. 15 is a schematic diagram showing a modification of the embodiment of FIG. 14;

FIG. 16 is a circuit diagram showing the linear amplifier stage of the arrangement shown in FIG. 15;

FIG. 17 is a circuit diagram showing the signal selecting stage and the variable gain amplifier stage of the arrangement shown in FIG. 15;

FIG. 18 is a characteristic diagram for illustrating the function of a remote-cutoff amplifier;

FIG. 19 is a schematic diagram showing a modification of the arrangement of FIGS. 12 and 13; and FIG. 20 is a characteristic diagram for illustrating a modified method in the use of photosensitive elements for generating the control signals.

Referring now to FIG. 1 which illustrates one example of a conventional, photoelectrical conversion unit used in a pattern-recognizing system, this unit is composed of a photosensitive element 11, an electrical source 12, a load resistor 13 and an amplifier 14. The element 11 consists of a wafer 15 formed of photoconductive material, such as CdSe, CdS and PbS, and two electrodes 16 and 17 fixed to opposite ends of the wafer 15. The electrical source 12 is connected to the electrode 16 of element 11 whose electrode 17 is connected to the load resistor 13; and the amplifier 14 is connected to the junction point of the resistor 13 and the electrode 17.

When a light is projected on the whole surface of the wafer 15 of the element 11, the impedance between the electrodes 16 and 17 is reduced to a low value, but, when a dark image crosses the wafer 15, such impedance is caused to increase to a high value. Consequently, the voltage drop across the load resistor 13 exhibits two different values according to the variation of the impedance of the element 11. This variation is applied to the amplifier 14, and the output signal i.e., the pattern signal, is obtained from an output terminal 18 and then logically operated on according to the conventional manner.

Figure 2:
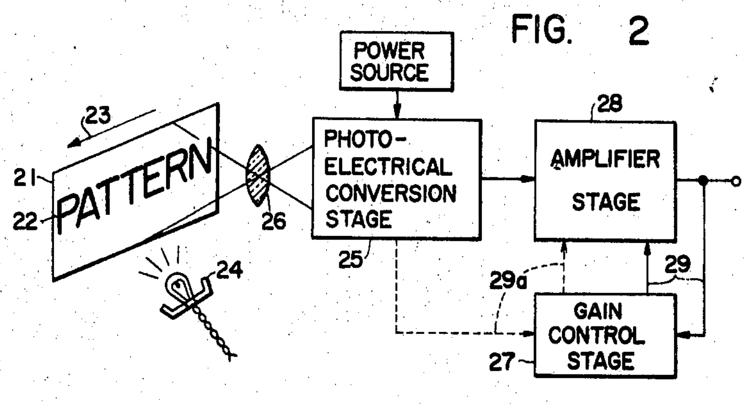
FIG. 2 is a schematic diagram showing a basic arrangement of the photoelectric conversion system of the present invention.

It has been heretofore known that it is possible to detect line elements or picture elements of the characters to be recognized, by using a number of such photoelectrical conversion units. Referring to FIG. 2 which illustrates a basic arrangement of the photoelectrical conversion system of the present invention, a sheet 21 on which characters 22 are printed is moved in the direction shown with an arrow 23, and illuminated by a light source 24. Consequently, optical images of the characters 22 are successively projected on a photosensitive panel (not shown) which forms a portion of a photoelectrical conversion stage 25, through a lens system 26. Though the detail of the photosensitive panel is not herein shown, this panel comprises a number of the photosensitive elements arranged in a predetermined, positional relationship. Consequently, the characters 22 on the sheet 21 are successively divided into line elements or picture elements thereof and converted into electrical signals (pattern signals) for each such line or picture element.

FIG. 3 illustrates waveforms of the pattern signal generated by such a photoelectrical conversion unit as shown in FIG. 1. In this case, it is considered that a pulselike voltage is used for the electrical source 12 in FIG. 1. The highest level HL of the pattern signal indicates a signal level (a space level) at the time when the photosensitive element 11 is illuminated by the light from the highlight portions (the blank portions) of the characters 22. The lowest level LL of the signal indicates a signal level (a mark level) at the time when the photosensitive element 11 is covered by the dark image from the line elements of the characters 22. Under the optimum condition shown in FIG. *3a*, both signal levels HL and LL coincide with predetermined standard levels SHL and SPT. Accordingly, it is possible to detect the line elements of the characters 22 by comparing such highest and lowest levels HL and LL with a predetermined, detecting level DL.

In the case when the output light-power of the source 24 or the sensitivity of the photosensitive element 11 decreases, as shown in FIG. *3b*, the highest and lowest levels HL and LL (i.e. the space level and mark level) are caused to decrease with such decrease. If the space level HL becomes less than the detecting level DL, as shown in the FIG., it becomes impossible to discriminate this level HL from the mark level LL.

On the other hand, in the case when the light reflection on the sheet 21 is relatively small, as shown in FIG. *3c*, the space level (the highest level) HL of the pattern signal may decrease to a value smaller than the detecting level DL, even if the mark level (the lowest level) LL is maintained at the standard level SPT. It therefore becomes impossible, similarly as the case shown in FIG. *3b*, to discriminate between both levels HL and LL.

Furthermore, in the case when the output light-power of the light source 24 increases and at the same time the contrast of the characters 22 becomes low, as shown in FIG. *3d*, both of the highest level HL and the lowest level LL may be caused to increased to values larger than the detecting level DL. Consequently, the discrimination of both levels HL and LL also becomes impossible.

The light source tends to exhibit different performances in wavelength characteristics and output light-power characteristics, at the beginning of lighting and after the warming up. Moreover, the sensitivity of the photosensitive element tends to largely change with temperature, humidity and time. It therefore is required to maintain said highest level (space level) HL of the pattern signal, which is the output signal of such photosensitive element. For this purpose, the arrangement shown in FIG. 2 is provided with a gain-control stage 27, thereby the gain of the amplifiers included in the amplifier stage 28 is controlled. The path shown with solid lines 29 indicates a feedback loop for controlling the gain of the amplifiers by using a control signal extracted from the output signals of the amplifier stage 28. On the other hand, the path shown with dotted lines 29*a* indicates a supplying path for transmitting a control signal detected or extracted from the output signals of the photosensitive elements included in the photoelectrical conversion stage 25, to the amplifier stage 28. According to a former case, it is also possible to compensate the variation of electrical characteristics of the amplifier stage 28.

The control signal for the amplifier stage 28 is obtained by the following methods.

1. Use of Combined Electric Source.

The photosensitive element shown in FIG. 1 is driven by a combined electric source composed of a pulselike current source and a direct current source. FIG. 4 illustrates the output signal of the photosensitive element, in which a pulselike signal component PS is used as the pattern signal for detecting the line of picture elements of the characters to be recognized, and a direct current or low frequency component CS is used as the control signal for controlling the gain of the amplifier. The control signal component CS also includes mark portions MP*a* originating from that dark image representing the characters to be recognized covering the photosensitive element. However, the variation in the level of the control signal CS caused from such mark portions MP*a* is relatively fast in comparison with the variation in the mean level of the signal CS. Accordingly, this variation can be easily eliminated in a suitable manner which will be hereinafter explained.

Since both the pattern-signal component PS and the control-signal component CS are produced from a single photosensitive element, they are caused to simultaneously change in a predetermined certain relationship in accordance with the factors mentioned above. Accordingly, the control signal extracted from the output signal shown in FIG. 4 indicates only the highest level HL (space level) in FIG. 3, if the variation component (mark portions MP*a* in FIG. 4) is eliminated. It therefore becomes possible to use such signal CS for controlling the gain of the amplifier. Though FIG. 4 illustrates such a case wherein both signal components PS and CS are positive voltages it is of course possible to use signals of opposite polarity.

2. Use of Specific Photosensitive Element.

The control signal can be obtained from a specific photosensitive element which is so arranged as to detect only the blank portions of the characters to be recognized, for example, the highlight edge-portions of the sheet on which the characters are printed. In this case, the electric source for the photosensitive element for pattern recognition can be composed of only a pulselike current source, and the source for this specific photosensitive element can be composed of only a direct current source. FIG. 5 shows waveforms of the pattern signal PS (FIG. *5a*) and the control signal CS (FIG. *5b*) in this case. A depressed portion DP of the curve in FIG. *5b* indicates that a colored or gray sheet is supplied and exposed to the light during this period.

FIG. 6 illustrates a schematic circuit diagram of one embodiment of the present invention. Though a number of such photoelectric conversion units as shown in this FIG. are used in practice, only one unit is shown in the FIG. for simplification. In the FIG., a combined electric source composed of a direct current source $E_1$ and a pulselike current source $E_2$ is connected between opposite electrodes of a photosensitive element S through a load resistor $R_1$ for detecting the impedance variation of such element. Consequently, an output signal, as shown in FIG. 4, is derived across the resistor $R_1$. This output signal is introduced to a variable gain amplifier VA. The output signal is amplified by the amplifier VA, and then introduced to an amplifier SA wherein the pattern-signal component is extracted and amplified. The output signal from the amplifier SA is extracted from a terminal OP and successively operated upon logically by means of known methods.

A part of the output signal from the variable gain amplifier VA is also introduced to a direct current amplifier DA wherein the control-signal component is extracted and amplified. The output signal from the amplifier DA is then introduced to a comparing circuit D*f* wherein the level of the control signal is compared with the standard voltage E*r*. The output signal of the comparing circuit D*f* which is a signal representing the difference between the control signal and the standard voltage, is amplified by another direct current amplifier A*f* and the output of which is then introduced to the variable gain amplifier VA so as to control the gain thereof. Said direct current has such a function that the quick variation, such as pulselike variation, can be eliminated, and only the direct current or very low frequency component representing the variation in the highest level (space level) of the pattern-signal component can be extracted, the details of such amplifier being hereinafter explained. The difference signal from the comparing circuit D*f* is amplified by the direct current amplifier A*f*, the output of which controls the variable gain amplifier VA so as to minimize the difference signal. Consequently, the pattern signal component included in the output signal of the photosensitve element S is effectively stabilized.

Since the control-signal component included in the output signal of the photosensitive element S is compared with the standard voltage E*r* and then fed back to the variable gain amplifier VA, it is possible to carry out stable gain-control for the amplifier VA, even if the electrical characteristics of such amplifier are not optimum. However, in the case wherein the amplifier VA includes such a variable resistance-element as changing its resistance value in inverse proportion to the level of the control signal, it will be apparent that the gain control of the amplifier can be carried out without comparing the control signal with the standard voltage.

FIG. 7 illustrates another embodiment of the present invention in which no feedback means is included. In this embodiment, the output signal composed of the pattern-signal component and the control-signal component is introduced to the direct current amplifier DA directly, through a buffer amplifier $AB_1$. A part of the output of the buffer amplifier $AB_1$ is introduced to the variable gain amplifier VA wherein the pattern-signal component is extracted and amplified. The control-signal component of the output signal from the buffer amplifier $AB_1$ is extracted and amplified by the direct current amplifier DA. The output control-signal from the amplifier DA is introduced to the variable gain amplifier VA through a buffer amplifier $AB_2$ so as to control the gain of the variable gain amplifier VA.

FIG. 8 illustrates an embodiment wherein a specific photosensitive element is used for obtaining the control signal for the variable gain amplifier. In this case, two photosensitive elements S and HS are provided. The element HS is for obtaining the control signal, which is so arranged as to detect the brightness of the sheets on which the characters to be recognized are printed. The element S is for detecting the pattern signal. The element HS is driven by a direct current source $E_1$, and the element S is driven by a pulselike current source $E_2$. The pattern signal detected by the element S is introduced to the variable gain amplifier VA wherein such signal is amplified. The amplified signal is derived from the terminal OP. On the other hand, the control signal from the element HS is introduced to the direct current amplifier DA. The amplified signal from the amplifier DA is introduced to the variable gain amplifier VA to control the gain thereof. If necessary, it is possible to compare the output signal of the direct current amplifier DA with the standard voltage E*r* by means of the comparing circuit D*f*, as shown with dotted lines in FIG. 8.

In the case wherein no feedback means is applied, it is required to use the variable gain amplifier having a special function or characteristics. FIG. 9 is a characteristic diagram for illustrating the basic principle of a variable gain amplifier in which a variable resistance-element is used as a load thereof. The horizontal and vertical axes $V_c$ and $I_c$ indicate the output voltage and current of a linear amplifier, respectively. When the input voltage (as parameter) increases in a step by step manner, the output current $I_c$ also increases in a step by step manner, as shown with curves $I_1$, $I_2$, ..... and $I_6$. If considered that a direct current voltage $V_s$ is applied to the amplifier, various resistance-load lines can be drawn as shown with lines $L_1$, $L_3$ and $L_5$, for example. The reference DB indicates the amplified output level of the control-signal component CS in FIG. 4, and the reference SP indicates the amplified output of the pattern-signal component PS in FIG. 4. In this case, the combined electric source is used, but both signal components CS and PS have opposite polarity.

It is now considered that when the control signal component CS increases, then the output current $I_c$ of the amplifier increases from $I_1$ to $I_3$. This means, for example, that the illuminating power of the light source increases. As far as the load line *L1* is applicable and the output current $I_c$ of the amplifier is maintained at the value $I_1$, the amplified level of the control-signal component CS must be maintained at the value DB. However, since the output current $I_c$ is caused to increase to the value *I3*, as mentioned above, the amplified level of the control-signal component CS is caused to increase to a value $V_{pl}$. Accordingly, if it is possible to change the load value of the amplifier so as to maintain the amplified level of the control-signal component CS at the value DB, in other words, if it is possible to decrease the gain of the amplifier in proportion to the increase of the input control-signal component CS, the variation in the level of the amplified control-signal component as well as the variation in the level of the amplified pattern-signal SP can be minimized. According to FIG. 9, the load line of the amplifier must be shifted to *L3* in order to maintain the amplified level of the control-signal component CS at the value DB, at the time when the output current $I_c$ increases to the value *I3*.

If it is considered that the load of the amplifier decreases from $L_1$ to $L_3$ when the output current increases from *I1* to $I_3$, the following equations hold:

$$L_1=\frac{DB}{I_1},$$

$$L_3=\frac{DB}{I_3},$$

thus;

$$\frac{L_3}{L_1}=\frac{I_1}{I_3},$$

Since the ratio $\frac{L_3}{L_1}$ indicates the ratio of the gains under the respective conditions, this equation indicates that the gain of the amplifier is caused to decrease with increase in the input voltage. When the output current $I_c$ decreases from *I5* to *I3* in proportion to the input voltage, it is required to establish a relationship as shown by the following equation:

$$\frac{I_3}{I_5}=\frac{L_5}{L_3}$$

As is apparent from the above description, it is necessary to use an amplifier having a variable resistance-element which varies its resistance value in inverse proportion to the input control-signal, in order to carry out the gain control according to the present invention. One example of elements applicable to such purpose is the so-called field-effect transistor. FIG. 10 is a characteristic diagram showing a gate-source voltage $V_{DS}$*vs.* drain-current $I_D$ characteristic of the field-effect transistor. As shown in the FIG., when the voltage $V_{DS}$ is maintained at a relatively small value, such as about 100mV., the transistor exhibits a variable-resistance characteristic. Accordingly, the impedance between the drain and the source of the transistor is caused to vary to a wide extent in proportion to the variation in the gate-source voltage $V_{GS}$. Thus, it becomes possible to carry out the gain control for the amplifier, by introducing the control signal extracted from the output signal of the photosensitive element to the amplifier as the gate-source voltage, i.e., as a bias voltage therefor. It is also possible to control the gain of the feedback amplifier by inserting the above-mentioned active element (field-effect transistor) into the feedback circuit of such amplifier.

FIG. 11 illustrates one example of the photoelectrical conversion unit of the present invention in which said field-effect transistor is used as a load for the amplifier. A transistor $TR_1$ forms a buffer circuit of the emitter-follower type for converting the impedance of the signal. A transistor $TR_2$ forms a linear amplifier for amplifying the output signal of the transistor $TR_1$. The emitter of this transistor is connected to a terminal for direct current source $E_4$ through a resistor $Re_1$ for providing negative feedback. A protection resistor $Rc$ is connected between the collector of the transistor $TR_2$ and a direct current source $E_5$. Indicated by the reference $FT_1$ is a field-effect transistor connected across the resistor $Rc$. The resistance value of the resistor $Rc$ is selected at a value, for example 100 k-ohms, which is sufficiently larger than the source-drain resistance (about several kilo-ohms) of the field-effect transistor $FT_1$ under the condition of remote cutoff. A direct current amplifier DA is provided for controlling the gate-source voltage (bias voltage) of the field-effect transistor $FT_1$, according to the control signal supplied from a terminal IP. A photosensitive element S is driven by a pulselike current source $E_2$ through a resistor $R_1$. Indicated with the reference $E_3$ is a bias-voltage source for the base of the transistor $TR_1$. The control signal to the direct current amplifier DA is obtained by, for example, such a method as shown in FIG. 8.

The pattern signal detected by the photosensitive element S is introduced to the base of the transistor $TR_2$ through the buffer transistor $TR_1$, and the amplified signal is derived from a terminal OP. On the other hand, the control signal is introduced to the gate of the field-effect transistor $FT_1$ through the direct current amplifier DA to control the impedance thereof. In this case, it may be considered that the transistor $TR_2$ serves as an attenuator rather than as an amplifier, and then it is desirable that the voltage drop across the field-effect transistor $FT_1$ is relatively small, such as 0.1 volt. However, in the case wherein the linearity of the load of the transistor $TR_2$ is not required to be very accurate, the voltage drop of about 1 volt is allowable.

FIG. 12 and 13 illustrate details of the embodiment shown in FIG. 6. In FIG. 12, which illustrates a schematic diagram of the circuit shown in FIG. 13, the block CN is a signal-generating stage or input stage of the combined signal composed of the pattern signal and the control signal. The signal from the stage is amplified by a variable gain amplifier VA which includes a load circuit comprising the above-mentioned active element. The amplified signal from the amplifier VA is further amplified by a linear amplifier LA, and introduced to a signal-extracting circuit SA and a direct current amplifier DA through buffer amplifier $AB_1$ and $AB_2$. The pattern-signal component included in the signal from the amplifier LA is extracted by the signal-extracting circuit SA, and successively inverted in polarity by an inverter circuit *I*1. A part of the output signal of the inverter *I*1 is derived from a terminal $OP_1$, and the remainder is further inverted in polarity by an inverter $I_2$ and derived from a terminal $OP_2$. Both output pattern-signals are introduced to the next stages (not shown) and by which they are logically operated upon.

On the other hand, the direct current amplifier DA extracts the control-signal component of the signal from the linear amplifier LA, which is then successively rectified or smoothened by a low-pass filter FL. The output control-signal from the filter FL is compared with the standard voltage E*r* by a comparing circuit D*f* comprising a differential amplifier circuit. The difference signal detected and amplified by the comparing circuit D*f* is fed back to the variable gain amplifier VA to stabilize the signal level.

In FIG. 13, which illustrates a variation of this embodiment, the same references as used in FIG. 12 represent similar elements in FIG. 13. The input stage CN includes a photosensitive element $S_1$, a pulse generator PG for the pattern-signal component, a direct current source $E_1$ for the control signal, and a load resistor $R_1$. This stage serves to generate the combined signal composed of the pattern-signal component and the control signal component. The variable gain control amplifier VA is composed of the same structure as the circuit shown in FIG. 11. The linear amplifier stage LA includes two transistors $TR_3$ and $TR_4$ for amplifying the output signal from the variable gain amplifier stage VA. The buffer amplifier stages $AB_1$ and $AB_2$ comprise, respectively, an emitter-follower circuit composed of two transistors $TR_5$ and $TR_6$, or $TR_{11}$ and $TR_{12}$ of standard Darlington connection. The input impedance of each circuit is selected at an extremely high value, and the output impedance is selected at an extremely low value, for providing isolation between the input and the output. The signal-extracting circuit SA comprises capacitors $C_1$, diode $D_1$ and resistors $R_{11}$ and $R_{12}$, which are connected as shown in the FIG. to form a high pass filter circuit. The pattern-signal component included in the signal from the buffer amplifier $AB_1$ is extracted by this circuit SA. The block DI corresponds to the combined arrangement of the inverters *I*1 and $I_2$ in FIG. 12. Each inverter *I*1 or $I_2$ includes two transistors $TR_7$ and $TR_8$, or $TR_9$ and $TR_{10}$,for inverting the polarity of the input signal therefor as well as shaping such signal. Accordingly, the pattern signal from the signal extracting stage SA is taken out from the output terminals $OP_1$ and $OP_2$ at opposite polarities.

The direct current amplifier stage DA includes a differential amplifier comprising two transistors $TR_{13}$ and $TR_{14}$ connected in push-pull relation, and a transistor $TR_{15}$ connected to the common junction point of said transistors for adjusting the bias voltage therefor. A part of the signal from the buffer amplifier stage $AB_2$ is introduced to the transistor $TR_{13}$, and the remainder is introduced to the transistor $TR_{14}$ through a high pass filter composed of capacitors $C_2$, diode $D_2$ and resistors $R_{13}$ and $R_{14}$. This filter circuit serves to pass the pattern-signal component and the pulselike variation component (MP*a* shown in FIG. 4). Consequently, these high frequency components are cancelled by the differential amplifier because the levels of such high frequency components supplied to both transistors $TR_{13}$ and $TR_{14}$ are equal to each other. Thus the control signal can be regenerated from the collector of the transistor $TR_{14}$. The time constant of the filter circuit $C_2$, $D_2$, $R_{13}$ and $R_{14}$ can be adjusted by changing the values of these elements. Accordingly, when such time constant is selected at suitable value, for example, about 50 milliseconds, the variation of the signal level corresponding to the highlight portions or blank portions of the characters to be recognized, (such variation being usually relatively slow), can be distinctly discriminated from the pattern-signal component and the other pulselike component (such as MP*a* shown in FIG. 4).

The filter stage FL is composed of two buffer amplifiers comprising transistors $TR_{16}$ and $TR_{17}$ and a low pass filter circuit comprising capacitor $C_3$, and resistors $R_{15}$ and $R_{16}$. The signal-comparing stage D*f* includes a differential amplifier comprising two transistors $TR_{18}$ and $TR_{19}$ connected in push-pull relation, and a transistor $TR_{20}$ connected to the common junction point of the emitters of both said transistors for adjusting the bias voltage therefor. The control signal from the filter stage FL is introduced to the transistor $TR_{18}$, and the standard voltage $Er$ is introduced to the transistor $TR_{19}$. Consequently, the difference voltage between such signal and standard voltage is detected by this differential amplifier, and such difference voltage is introduced to the gate of the field-effect transistor $FT_1$ to control the gain of the variable gain amplifier VA.

There are some difficulties in the system wherein both the pattern signal and the control signal are obtained from a single photosensitive element. That is to say, when the variation in the pattern-signal component included in the output signal of the photosensitive element is relatively slow, the variable gain amplifier is caused to control according to such variation, and then the information included in the pattern-signal component is eliminated in the stage of the variable gain control amplifier. Consequently, it becomes impossible to detect the line elements or picture elements of the characters to be recognized, in such a case wherein the sheet or paper on which the characters are printed does not move. Furthermore, when the characters printed or written on various kinds of cards which are successively introduced at a very high speed, are read out by the photoelectrical conversion units, the brightness of the blank portions (space portions) is not always constant, because the light-reflection from the cards tends to change according to the stain or color of the cards. For such reasons, the variation in the light-reflection of the cards is also detected as pattern-signal component by the photosensitive elements to bring about misoperation of the system.

In order to avoid these disadvantages, it will be very effective to use the specific photosensitive elements shown in FIG. 8. Though FIG. 8 illustrates only a case wherein a single specific element HS is provided for controlling the gain of the variable gain amplifier VA, it is also possible to use a plurality of elements which are so arranged as to detect the brightness of various portions of the sheets, as hereinafter explained. It is also possible to commonly control a number of pattern-signal amplifiers by a limited number of specific photosensitive elements for detecting the brightness of the sheet. Furthermore, though it is possible to directly control the variable gain amplifiers by the outputs of such specific elements, it is also possible to combine the output signals of the specific elements with the pattern signals and to introduce such combined signals to the variable gain amplifiers for controlling the gain thereof according to such a system as shown in FIG. 6.

Figure 5B:
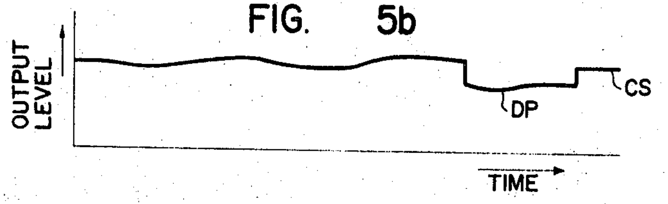

FIG. 14 illustrates one embodiment wherein a single specific photosensitive element is used for commonly controlling a number of photoelectrical conversion units for detecting the pattern signals. In the FIG., a plurality of photosensitive elements $S_1$, $S_2$, ..., and $S_n$ are provided for detecting the pattern signals. Each of such elements is driven by a common pulselike current source $E_2$ through a resistor $R_1$, $R_2$, ..., or $R_n$. The pattern signals detected by these elements are respectively introduced to variable gain amplifiers $VA_1$, $VA_2$, ..., and $VA_n$, and the amplified output signals are derived from terminals $OP_1$, $OP_2$, ..., and $OP_n$. The control signal detected by the specific photosensitive element HS is introduced to a direct-current amplifier DA, and the amplified output signal is commonly introduced to the variable gain amplifiers $VA_1$, $VA_2$, ..., and $VA_n$ through a buffer amplifier AB. The output signal (control signal) from the specific photosensitive element HS has a waveform as shown in FIG. 5*b*. The variation component DP in FIG. 5*b* originating from that a sheet having a low light-reflection factor is suddenly supplied to the specific photosensitive element HS and is introduced to the variable gain amplifiers $VA_1$, $VA_2$, ..., and VA together with the other slow-variation component, such that it can be effectively stabilized.

FIG. 15 illustrates another embodiment wherein a plurality of specific photosensitive elements are provided for detecting the brightness of various space-portions of the characters to be recognized. In this FIG., the same references as used in FIG. 14 indicate similar elements in FIG. 15. In this case, three specific photosensitive elements $HS_1$, $HS_2$ and $HS_3$, but not limited thereto, are provided for detecting the brightness of three space-portions of the characters. The output signals from these elements are selectively introduced to three groups of linear amplifiers $CB_{11}$, $CB_{21}$,...$CB_{n1}$, $CB_{12}$, $CB_{22}$, ...$CB_{n2}$, and $CB_{13}$, $CB_{23}$,...$CB_{n3}$ through buffer amplifiers $AB_1$, $AB_2$ and $AB_3$. These linear amplifiers are so assembled as to adjust the output level thereof, and then the control signals to be introduced to the variable gain amplifiers $VA_1$, $VA_2$..., and $VA_n$ are adjusted at a predetermined level. The output signals of these linear amplifiers are optionally introduced to signal-slecting circuit $NP_1$, $NP_2$..., $NP_n$. Each of these circuits serves to select three input signals thereto and controls the gain of the variable gain amplifier $VA_1$, $VA_2$... or $VA_n$. 2..., When a stain exists on the sheet on which the characters to be recognized are printed, and when such stain is detected by one of the specific photosensitive elements $HS_1$, $HS_2$ and $HS_3$, it is not desirable that the variable gain amplifiers $VA_1$, $VA_2$..., $VA_n$ are controlled by the control signal from the specific photosensitive element which detects such stain. The signal-selecting circuits $NP_1$, $NP_2$..., and $NP_n$ are available for eliminating misoperation originating from such stain. These signal-selecting circuits can be also provided directly after the buffer amplifiers $AB_1$, $AB_2$ and $AB_3$. In such a case, it is possible to reduce the number of the linear amplifiers CB. Besides, it is possible to eliminate these linear amplifiers CB by using such variable gain amplifiers VA as having adjusting means for input signals thereto.

FIG. 16 is a circuit arrangement of a part of the photoelectrical conversion system shown in FIG. 15, for illustrating the function of the linear amplifiers CB. The control signal from the photosensitive element $HS_1$ is introduced to a base of a transistor $TR_{02}$ through a transistor $TR_{01}$ which constitutes a buffer amplifier. The level of the output signal from the transistor $TR_{02}$ can be adjusted by a variable collector-resistor $R_{C2}$, and a transistor $TR_{04}$ constituting an emitter-follower amplifier . The direct current voltage across an emitter-resistor $R_{e2}$ of the transistor $TR_{04}$ is adjusted by changing the value of a resistor $R_{b1}$ connected between an emitter and a base thereof. Accordingly, it is possible to adjust the output level of the transistor $TR_{02}$ by changing the values of the variable resistors $R_{c2}$ and $R_{b1}$. The output signal from the transistor $TR_{02}$ is taken out through a transistor $TR_{03}$ constituting a buffer amplifier, and used for controlling the gain of the aforementioned, variable gain amplifiers.

FIG. 17 illustrates the detail of the signal-selecting circuits NP and the variable gain amplifiers VA, but only one section thereof is illustrated for simplification. In this case, the photosensitive element $S_1$ is connected across a direct current source $E_4$ through the pulselike current source $E_2$ and resistors $R_{111}$ and $R_{112}$. Three switching diodes $d_{11}$, $d_{12}$ and $d_{13}$ are connected to the junction point J of the resistors $R_{111}$ and $R_{112}$. The opposite terminals of such diodes are connected to the output terminals of the linear amplifiers CB shown in FIG. 16. The junction point of the element $S_1$ and the resistor $R_{111}$ is connected to a gate of a field-effect transistor $FT_2$ constituting a part of the variable gain amplifier VA. When the specific photosensitive elements $HS_1$, $HS_2$ and $HS_3$ in FIG. 15 are brightly illuminated, the control signals having a large amplitude (negative voltage) are introduced to the respective diodes $d_{11}$, $d_{12}$ and $d_{13}$ from the above-mentioned, linear amplifiers CB. Since the impedance seen from the junction point J to the resistor $R_{111}$ is relatively high, almost all the current from the source $E_4$ flows through the diodes $d_{11}$, $d_{12}$ and $d_{13}$. If the specific photosensitive elements are covered by dark images, the potential of the control signals supplied to the diodes $d_{11}$,$d_{12}$ and $d_{13}$ is caused to increase toward the positive direction. Consequently, all the diodes are cut off in this instant. However, if at least one of the photosensitive elements $HS_1$, $HS_2$ and $HS_3$ is brightly illuminated, the potential at the junction point J is maintained at low value. This means that the potential at the gate of the field-effect transistor $FT_2$ can be determined by the control signal having the largest negative voltage. Thus, the gain of the variable gain amplifier VA is controlled by only the control signals which are generated by the specific photosensitive elements illuminated brightly.

The field-effect transistor $FT_2$ is caused to operate under the remote cutoff condition. FIG. 18 illustrates the remote cutoff characteristics of an amplifier. The gain of the remote cutoff amplifier can be controlled by changing the bias voltage therefor. Such variable gain amplifiers having the remote cutoff characteristics can be assembled with various types of active elements, but, in the embodiment shown in FIG. 17, the amplifier using the field-effect transistor $FT_2$ is illustrated as one example. In the case of a field-effect transistor, the horizontal axis of FIG. 18 indicates the gate source voltage $V_{GS}$, and the vertical axis indicates the drain current. As shown in FIG. 18, the field-effect transistor exhibits a remote cutoff characteristic under the condition of the constant drain source voltage $V_{DS}$. For the purpose of obtaining an improved sensitivity for photoelectrical conversion, it is desirable to apply the control signal (as the bias voltage) to the gate of the field-effect transistor under the condition that such control-signal component is positioned at the positive side of the bias point of direct current. If the amplitude of the control signal is sufficiently small in comparison with the direct current bias voltage, such consideration as mentioned above will be unnecessary.

Referring again to FIG. 17, the pattern signal from the photosensitive element $S_1$ is introduced to the field-effect transistor $FT_2$ where such pattern signal is amplified under the control of the control signals from the linear amplifiers CB to stabilize at a predetermined level. The output of the transistor $FT_2$ is further amplified by transistors $TR_{111}$ and $TR_{112}$, and taken out from the terminal $OP_1$.

FIG. 19 illustrates a modification of the embodiment shown in FIGS. 12 and 13. This embodiment differs from the embodiment of FIGS. 12 and 13. only in the signal generating stage CN, and the remainder is the same as those of FIGS. 12 and 13. In FIG. 19, the signal generating stage CN is composed of the similar arrangement to the signal-selecting circuit NP in FIG. 17. According to such arrangement, it is possible to combine the pattern signal from the photosenstitive element $S_1$ with the control signals from the specific photosenstive elements $HS_1$, $HS_2$ and $HS_3$ shown in FIG. 15.

FIG. 20 is a characteristic diagram for illustrating a modified method of the specific photosensitive elements for generating the control signals. In the FIG., the horizontal axis SI indicates the means level of the pattern signal introduced to the aforementioned, variable gain amplifier, and the vertical axis SO indicates the mean level of the output signal thereof. Each of the curves $HS_{1a}$, $HS_{2a}$ and $HS_{3a}$ represents, respectively, the variation in the output signal of the amplifier in the case wherein each of the photosensitive elements $HS_1$, $HS_2$, and $HS_3$ in FIG. 15 for generating the control signals is caused to operate, selectively, under the different conditions. Though the respective curves cannot be maintained to be completely flat, it is possible to maintain flat the total characteristics of the amplifier in a certain wide range, by combining the control signals from the elements $HS_1$, $HS_2$ and $HS_3$ in staggered relation.

As can be apparent from the above description, according to the present invention, it is possible to eliminate the noise or low frequency component included in the pattern signals. When the specific photosensitive elements are provided for obtaining the control signals, it is also possible to construct the system so as to be responsive to the noise component having a relatively high frequency.

While I have shown and described only a few embodiments of the present invention, it will be understood that those are not limited thereto but are susceptible of numerous changes and modifications as known to a person skilled in the art, and I therefore do not wish to be limited to the details shown and described herein but intend to cover such modifications and changes as are within the scope of the appended claims.

I claim:

1. A photoelectric conversion system for pattern-recognition apparatus and the like, having photosensitive means for producing pattern signals including a direct current component and alternating current component and means for stabilizing the respective components of the signals, said respective signal stabilizing means comprising:
   - a variable gain amplifier comprising an amplifier stage and a load impedance and connected to each of said photosensitive means for amplifying said pattern signals;
   - said load impedance comprising a field-effect transistor operated as a linear variable resistor;
   - a direct current selecting circuit connected to said variable gain amplifier for extracting said direct current component of said pattern signal:
   - A time constant circuit connected to said direct current selecting circuit for producing amplitude envelopes of said direct current component;
   - A comparator circuit for providing a difference signal representative of the difference between said amplitude envelopes and a standard level provided thereto; and
   - said difference signal being fed to said field-effect transistor of said variable gain amplifier to control the gain in a negative feedback mode.

2. A photoelectric conversion system according to claim 1, wherein each of said photosensitive means is provided with a current source composed of a direct current component and a pulsing current component.

3. A photoelectric conversion system for pattern-recognition apparatus and the like, comprising:
   - a plurality of blank pattern sensing means for producing blank pattern signals, at least one of which is arranged to detect only the blank portions of said pattern;
   - a signal level detecting circuit through which is detected the highest level of each of said blank pattern signals and which comprises a plurality of diodes, each receiving respective signals from said plurality of blank pattern sensing means at one end, each one of said plurality of diodes being connected together at the opposite end thereof;
   - a direct current amplifying stage amplifying said detected highest level of signals;
   - photosensitive means for producing pattern signals; and
   - at least one variable gain amplifier comprising a field-effect transistor operating as a remote cutoff amplifying device, amplifying said pattern signals and controlled by said highest level of said blank pattern signals, in such a manner as to suppress background variations.

4. A photoelectric conversion system for pattern recognition apparatus and the like, comprising:
   - a plurality of blank pattern sensing means for producing blank pattern signals, one of which is arranged to detect only the blank portions of said pattern;
   - a signal level detecting circuit for detecting the highest level of said blank pattern signals;
   - said signal level detecting circuit comprising a plurality of diodes for receiving signals from said plurality of blank pattern sensing means at one end of each of said diodes, said plurality of diodes being connected together at the opposite end of each of said diodes; and
   - photosensitive means for producing pattern signals having a direct current component and an alternating current component, and means for stabilizing the respective components of the signals having;
     - a variable gain amplifier for amplifying one of said blank pattern signals and said pattern signals,
     - a direct current selecting circuit connected to said variable gain amplifier for extracting said blank pattern signal,
     - a time constant circuit connected to said direct current selecting circuit for producing amplitude envelopes of said blank pattern signals, and
     - a comparator circuit providing a difference signal representative of the difference between said amplitude envelopes and a standard level signal provided thereto, said difference signal being fed to said variable gain amplifier to control the gain in the negative feedback manner.

5. A photoelectric conversion system according to claim 4, wherein said variable gain amplifier comprises an amplifier stage and a load impedance, said load impedance comprising a field-effect transistor operating as a linear variable resistor, said field-effect transistor being controlled by said difference signal.

6. A photoelectric conversion system for pattern recognition apparatus and the like, comprising:

a plurality of blank pattern sensing means for producing blank pattern signals, one of which is arranged to detect only the blank portions of said pattern;

a signal level detecting circuit for detecting the highest level of said blank pattern signals; and photosensitive means for producing pattern signals having direct current component and an alternating current component, and means for stabilizing the respective components of the signals having, a variable gain amplifier for amplifying one of said blank pattern signals and said pattern signals, said variable gain amplifier comprising an amplifier stage and a load impedance, said load impedance comprising a field-effect transistor operating as a linear variable resistor, a direct current selecting circuit connected to said variable gain amplifier for extracting said blank pattern signal, a time constant circuit connected to said direct current selecting circuit for producing amplitude envelopes of said blank pattern signals, and a comparator circuit providing a difference signal representative of the difference between said amplitude envelopes and a standard level signal provided thereto, said difference signal being fed to said field-effect transistor of said variable gain amplifier to control the gain in the negative feedback manner.